United States Patent
Yamakawa

(10) Patent No.: US 8,794,284 B2
(45) Date of Patent: Aug. 5, 2014

(54) PNEUMATIC TIRE

(75) Inventor: Takahiro Yamakawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/328,734

(22) Filed: Dec. 16, 2011

(65) Prior Publication Data

US 2012/0199261 A1 Aug. 9, 2012

(30) Foreign Application Priority Data

Feb. 7, 2011 (JP) ................................. 2011-023930

(51) Int. Cl.
*B60C 13/02* (2006.01)
*B60C 13/00* (2006.01)

(52) U.S. Cl.
USPC ........................................................ 152/523

(58) Field of Classification Search
USPC ................................................ 152/523–525
See application file for complete search history.

(56) References Cited

U.S. PATENT DOCUMENTS 2,800,098 A * 7/1957 Crosby, Jr. .................. 116/34 R

FOREIGN PATENT DOCUMENTS

| JP | 11-321243 A | | 11/1999 | |
|---|---|---|---|---|
| JP | 2003025813 A | * | 1/2003 | .............. B60C 13/00 |
| JP | 2010254088 A | * | 11/2010 | .............. B60C 13/00 |
| JP | 2011116306 A | * | 6/2011 | .............. B60C 13/00 |
| WO | WO 2009029088 A1 | * | 3/2009 | |

OTHER PUBLICATIONS

Machine Translation: JP2011-116306; Iwabuchi, Sotaro; No date.*
Machine Translation: JP2003-025813; Ota, Shigeki; No date.*
Machine Translation: JP2010-254088; Nukushina, Ryosuke; No date.*

* cited by examiner

*Primary Examiner* — Justin Fischer
*Assistant Examiner* — Kendra Shin
(74) *Attorney, Agent, or Firm* — Global IP Counselors, LLP

(57) ABSTRACT

A pneumatic tire includes a tread portion extending in a tire circumferential direction and a pair of sidewall sections disposed on both sides of the tread portion in a tire width direction. At least one sidewall section includes a surface pattern region having a plurality of minute regions arranged along the circumferential direction and a tire radial direction. The minute regions are visually distinguishable from surrounding regions due to light reflection characteristics or surface unevenness. Width dimensions along the circumferential direction of adjacent minute regions juxtaposed with each along the circumferential direction vary among at least three different widths. The width dimensions of adjacent minute sections vary continuously or in steps along the circumferential direction. The adjacent minute regions are juxtaposed next to each other at at least three different interval sizes, and are arranged along the circumferential direction at prescribed intervals whose sizes vary continuously or in steps.

18 Claims, 7 Drawing Sheets

CIRCUMFERENTIAL DIRECTION OF TIRE

20

PNEUMATIC TIRE

CROSS-REFERENCE TO RELATED APPLICATIONS

This application claims priority under 35 U.S.C. §119(a) to Japanese Patent Application No. 2011-023930, filed in Japan on Feb. 7, 2011, the entire contents of Japanese Patent Application No. 2011-023930 are hereby incorporated herein by reference.

BACKGROUND

1. Field of the Invention

The present invention relates to a pneumatic tire having a side wall section.

2. Background Information

In recent years, side walls of pneumatic tires are being made with smaller thicknesses (also called "side gauge") in order to reduce weight and lower a rolling resistance. However, when the side gauge is reduced, a side wall surface tends to exhibit a poor external appearance. Although the poor external appearance does not have an adverse effect on the durability and the operating performance of the tire, a user may be concerned that the tire may have poor durability and operating performance.

In a forming process that is performed when a tire is manufactured, a sheet-like carcass member is wrapped around a tire forming drum, and a wrap starting end and a wrap finishing end are joined such that they partially overlap each other. Consequently, a thickness is larger at the overlapped portion, and this portion ultimately appears as an uneven portion of a sidewall surface of the tire. In a radial tire made using a single carcass member, this uneven portion is conspicuously noticeable.

A known pneumatic tire is described in Japanese Laid-open Patent Publication No. 11-321243. This known tire is configured to prevent an unevenness that exists on a sidewall surface of a tire from being conspicuous. This know tire is also configured to prevent or suppress an occurrence of an external appearance defect at locations adjacent to a cut start and a cut finish resulting from gradual wear of a cutting edge of a cutting tool during formation of a recessed section in a mold. The pneumatic tire has a circular ornamental body on a surface of which are formed a multitude of small semispherical or substantially semispherical protrusions each having a cross sectional width and a height of 0.3 to 2 mm. The protrusions include at least two types of protrusions having different sizes. A bottom surface area of the small protrusions is 2 to 6% the size of a bottom surface area of the large protrusions.

SUMMARY

However, the unevenness that appears on a sidewall surface of the pneumatic tire described in Japanese Laid-open Patent Publication No. 11-321243 may not be sufficiently inconspicuous.

Therefore, an object of the present invention is to provide a pneumatic tire in which an unevenness existing in a sidewall surface can be made sufficiently inconspicuous.

A pneumatic tire according to a disclosed embodiment includes a sidewall section. The sidewall section of the tire has a surface pattern region comprising a plurality of minute regions that are arranged in a circumferential direction and a radial direction of the tire and demarcated from surrounding regions by a light reflection characteristic or surface unevenness. The minute regions are arranged such that there are at least three different sizes of interval between adjacent minute regions juxtaposed along a circumferential direction of the tire. The adjacent minute regions are arranged with prescribed intervals in-between in a circumferential direction of the tire such that the three or more sizes of intervals vary continuously or discretely in a circumferential direction of the tire.

It is preferable for adjacent minute regions to be arranged such that the intervals vary periodically along a circumferential direction of the tire and for positions of the adjacent minute regions along a radial direction of the tire to vary periodically in accordance with the intervals. The intervals vary according to a periodic function, e.g., a sine wave or a triangular wave. The aforementioned period is preferably 10 mm to 60 mm.

The minute regions can be partitioned from surrounding regions by, for example, partitioning walls. The minute regions also can be protruding regions each protruding from a surrounding region or recessed regions each recessed into a surrounding region. The minute regions are regions that can be recognized visually due to a difference in a light reflecting characteristic resulting from the existence or absence of a fine surface roughness.

Accordingly, with a pneumatic tire according to the disclosed embodiments, an unevenness existing in a sidewall surface can be sufficiently obscured.

DETAILED DESCRIPTION OF EMBODIMENTS

A pneumatic tire according to disclosed embodiments will now be explained in detail. In the explanations that follow, a "circumferential direction of the tire" corresponds to a direction in which a tread section of the tire rotates when the tread section is rotated about a rotational axis of the tire and a "radial direction of the tire" corresponds to a direction extending radially from the rotational axis of the tire.

Figure 1:
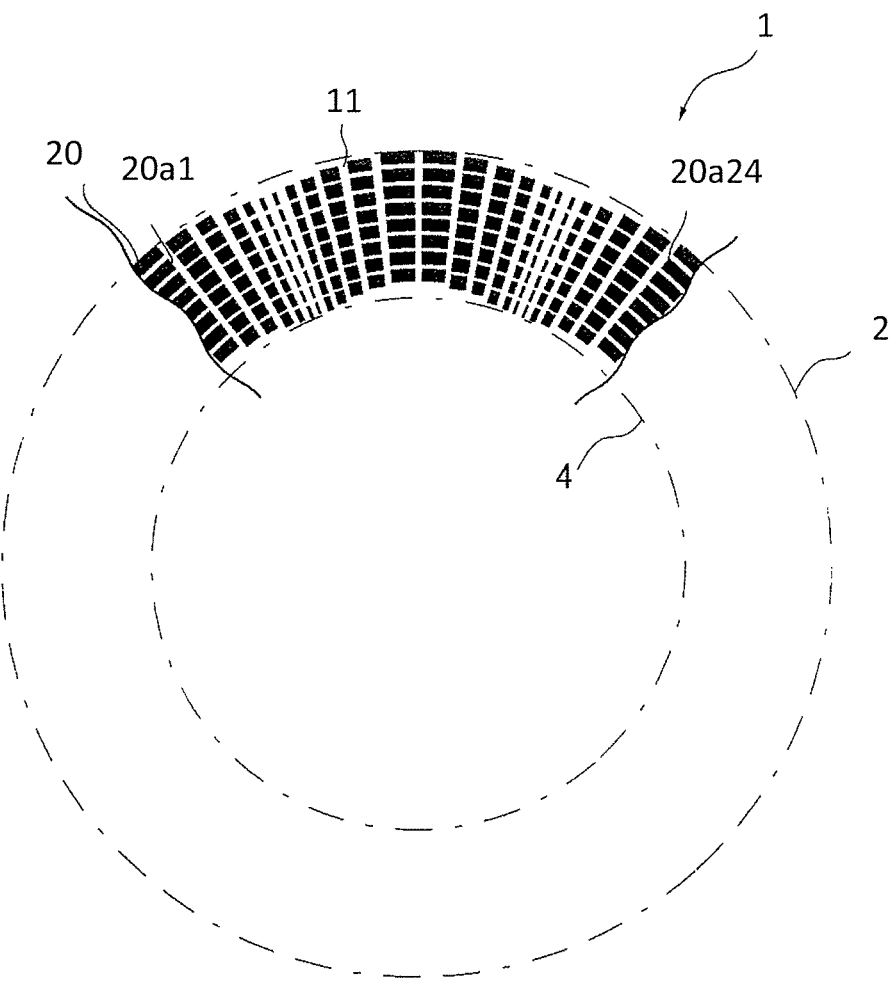
FIG. 1 shows a surface of a sidewall section of a pneumatic tire according to a disclosed embodiment.

FIG. 1 shows a surface of a side wall section 3 (see FIG. 2) of a pneumatic tire (hereinafter called "tire") 1 according to a disclosed embodiment. In FIG. 1, a tread section 2 is represented with a circular arc-shaped single-dot chain line, and a bead section 4 is represented with a circular arc-shaped single-dot chain line.

Figure 2:
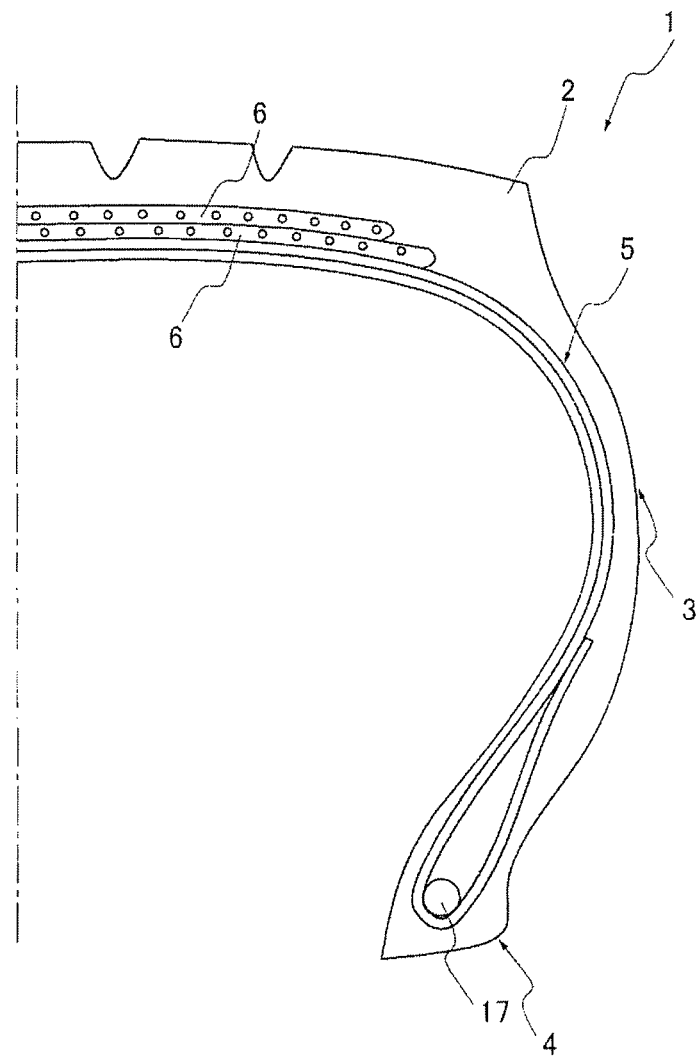
FIG. 2 is a cross sectional view of a half portion of a pneumatic tire shown in FIG. 1.

FIG. 2 is a cross-sectional view showing a half portion of the tire 1. As shown in FIG. 2, the tire 1 has a tread section 2 and a pair of sidewall sections 3 disposed on both sides of the tread portion. The tire 1 further includes a head section 4, a carcass layer 5, and a belt layer 6. The tire 1 also has an inner liner layer and other parts not shown in the Figures. A sidewall section 3 and a bead section 4 are arranged on each of two opposite sides of the tread section 2 so as to be separated along a widthwise direction of the tire (a tire width direction). Each of the bead sections 4 has a bead core 17. For purposes of this discussion, one sidewall section 3 and one bead section 4 illustrated. However, each of the sidewall sections 3 and bead sections 4 can include the features discussed herein.

A side pattern indicating region 11 shown in FIG. 1 and a marking indicating region (not shown) are provided on a sidewall section 3 along a circumference of the tire 1 (tire circumferential direction). The marking indicating region includes such markings as a product name of the tire, a brand name, a tire manufacturer name, lettering, symbols, and numerals indicating such information as tire size. The side pattern indicating region 11 is contrived to surround a periphery of the marking indicating region. The side pattern indicating region 11 will now be explained. It is acceptable for a side pattern indicating region 11 to be provided on only one of the side wall sections 3 or on both of the side wall sections 3.

As shown in FIG. 1, the side pattern indicating region 11 of the side wall surface has a plurality of minute regions 20. The minute regions 20 are generally rectangular in shape, but can be any suitable shape. The minute regions 20 are provided with a roughness of surface that enables them to be visually distinguished from surrounding regions and arranged along circumferential and radial directions of the tire 1. More specifically, the minute regions 20 are arranged in rows along radial directions of the tire. Each of the minute regions 20 has another juxtaposed minute region 20 existing adjacently in a circumferential direction of the tire. Here, juxtaposed refers to an arrangement in which one minute region 20 and another minute region 20 positioned adjacently to each other along a circumferential direction are positioned in a radial direction such that a side of the one minute region 20 aligned along a radial direction of the tire and a side of the adjacent other minute region 20 aligned along a radial direction of the tire are at least partially overlapped with each other. Minute regions 20 that are juxtaposed in this manner are called "adjacent minute regions." Thus, if one selects one minute region 20 in a row of minute regions 20 arranged along a radial direction of the tire, then a circle of adjacent minute regions juxtaposed along a circumferential direction of the tire is obtained. In FIG. 1, for example, the minute regions $20_{a1}$ to $20_{a24}$ are included in a group of adjacent minute regions.

As shown in FIG. 1, each of the minute regions 20 in a group of adjacent minute regions juxtaposed along a circumferential direction of the tire has one of six different width sizes along a circumferential direction of the tire. Furthermore, the positions of the adjacent minute regions along a radial direction of the tire vary with respect to the circumferential direction of the tire, and the adjacent minute regions are arranged in an order according to size such that the widths of the adjacent minute regions vary in a continuous manner along the circumferential direction of the tire.

Figure 3:
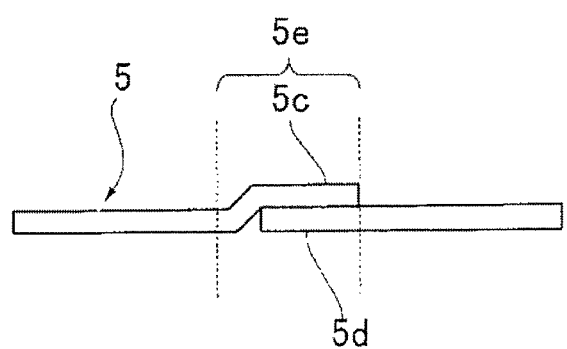
FIG. 3 is a view illustrating an overlap of a carcass member causing an unevenness to appear in a sidewall surface of a tire.
Figure 3:
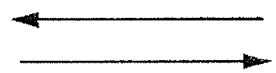

The purpose of providing minute regions 20 on a sidewall surface such that they are arranged in groups of adjacent minute regions is to form a side pattern that is made up of the minute regions 20 and appears to an observer of the tire as though the side surface undulates in a three-dimensional manner, thereby obscuring an unevenness that actually exists on the sidewall surface. The unevenness occurring on a surface of the sidewall is, for example, aligned along a radial direction of the tire and results from, for example, a step-like portion created by overlapping of a wrap finishing end 5c and a wrap starting end 5d of a carcass layer 5 at a portion 5e as shown in FIG. 3.

Figure 4:
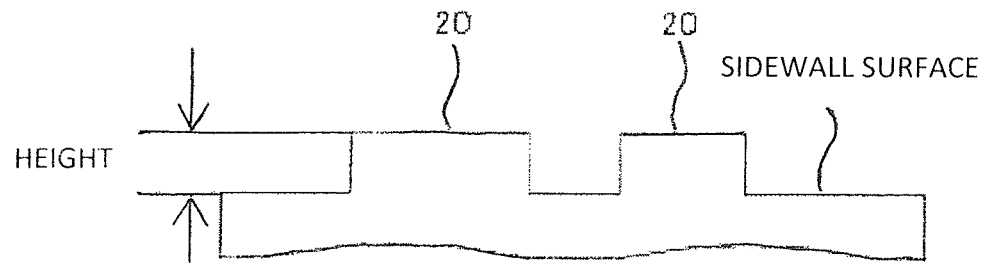
FIGS. 4(a) to (c) are cross sectional views of minute regions.
Figure 4:
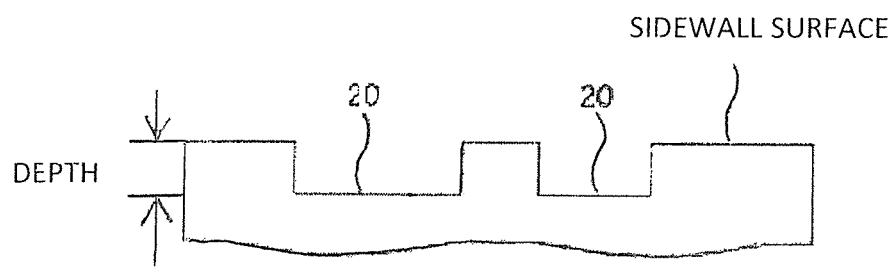
Figure 4:
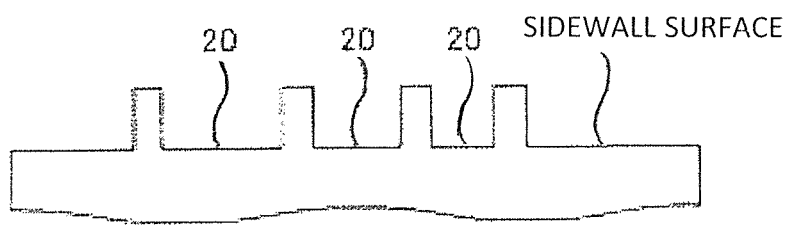

FIG. 4(a) shows an example of a cross section of a minute region 20 according to this embodiment. FIG. 4(a) exaggerates a height of the partitions 20. Partitions separating the minute regions 20 (including adjacent minute regions) from one another in the circumferential and radial directions of the tire have the form of grooves, as shown in FIG. 4(a). Thus, surfaces of the minute regions 20 protrude such that the minute regions 20 are visually distinguishable from surrounding regions. It is acceptable if the minute regions 20 are recessed as shown in FIG. 4(b) instead of protruding as shown in FIG. 4(a). In such a case, the partitions between the minute regions 20 would be protrusions and the minute regions 20 would be recessed with respect to the partitions. Thus, the recessed shape of the minute regions 20 would make them visually distinguishable from surrounding regions.

Figure 5:
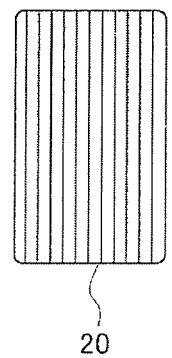
FIG. 5 illustrates an example of a fine roughness applied to a minute region.

It is also acceptable for the minute regions 20 to be separated from surrounding regions by partitioning walls such that a perimeter of each of the minute regions 20 is bordered and visually distinguishable from surrounding regions as shown in FIG. 4(c). It is also acceptable for each of the minute regions 20 to be a region in which a serration process has been applied to form ridges spaced at fixed intervals as shown in FIG. 5. Due to the ridges, light incident on a surface of the minute regions 20 is diffused and reflected. Thus, the amount of light entering an observer's field of view after being diffused and reflected by the minute regions 20 is smaller than the amount of light coming from surrounding regions. Consequently, the minute regions 20 appear darker than surrounding regions and can be distinguished visually. In short, the minute regions 20 can be visually distinguished from surrounding regions due to a light reflection characteristic.

Although in this embodiment the minute regions 20 are generally rectangular, it is acceptable for them to be circular, elliptical, triangular or any other suitable shape. Regardless of which of these shapes is used, the side pattern formed by the minute regions 20 will obscure an unevenness that actually exists in the sidewall surface. A height or depth of the minute regions 20 (see FIG. 4(a) or (b)) is preferably, for example, 0.3 mm to 3.0 mm, and it is acceptable for the height or depth to be the same at all locations or to vary according to the aforementioned size. Regardless of which of these shapes is used, the side pattern formed by the minute regions 20 will obscure an unevenness that actually exists in the sidewall surface.

In order to obtain a side pattern that obscures an unevenness that actually exists in the sidewall surface, there are at least three different sizes of adjacent minute regions and, preferably, four to eight different sizes. With two sizes, it is difficult to obtain a side pattern that makes the side surface appear three-dimensional. Meanwhile, having more than eight sizes does not improve the effect of obscuring the actual unevenness.

Although in this embodiment the radial positions of adjacent minute regions vary with periodically with respect to a circumferential direction of the tire, it is acceptable if the radial positions do not vary so long as the sizes of adjacent minute regions vary along a circumferential direction of the tire. This size variation does not have to be periodic, but a periodic size variation is preferable from the standpoint of making the side surface appear three-dimensional. When the variation is periodic, it is acceptable regardless of whether the adjacent minute regions are arranged such that the sizes of adjacent minute regions vary continuously or discretely (e.g., in a step-like fashion or in steps). However, from the standpoint of making the side surface appear three-dimensional, it is preferable for the adjacent minute regions to be arranged such that the sizes vary continuously. Additionally, from the standpoint of making the side surface appear to undulate three-dimensionally in a wave-like manner, it is preferable for the a phase of the size variation of adjacent minute regions to be the same as a phase of the radial position variation of the adjacent minute regions.

Figure 6:
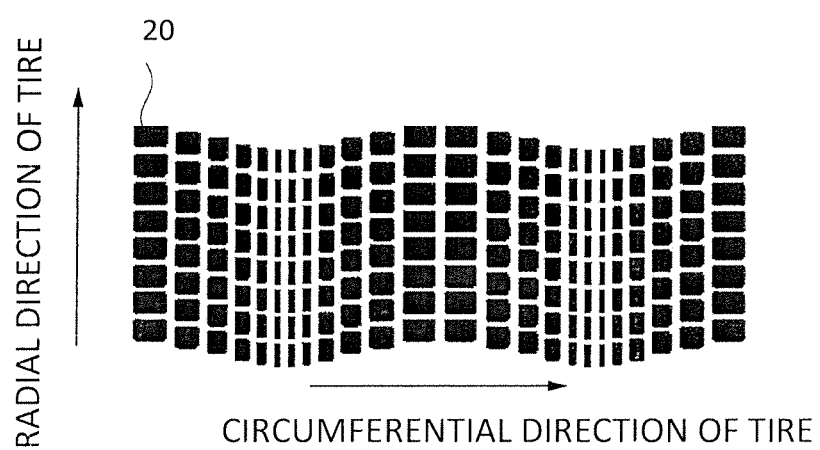
FIG. 6 depicts a side pattern of a sidewall surface as spread out in a linear form according to a disclosed embodiment.

FIG. 6 depicts a side pattern made up of minute regions 20 used on a sidewall surface of a tire 1 according to the embodiment shown in FIGS. 1-5 as the side pattern would appear if the tire were spread out in a linear form. The pattern shown in FIG. 6 causes the surface to appear to undulate in a three-dimensional manner. Consequently, a person observing the sidewall surface of the tire 1 (shown in FIG. 1) having this pattern formed on the sidewall surface will not readily notice an actual unevenness existing on the sidewall surface.

Figure 7:
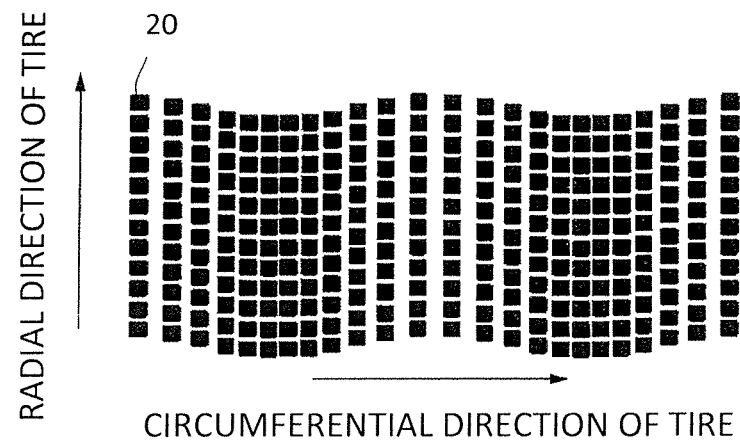
FIG. 7 depicts a side pattern of a sidewall surface as spread out in a linear form according to another disclosed embodiment.

FIG. 7 depicts a side pattern made up of minute regions 20 used on a sidewall surface of a tire 1 according to the embodiment shown in FIGS. 1-5 as the side pattern would appear if the tire were spread out in a linear form. In FIG. 7, the horizontal direction corresponds to the circumferential direction of the tire and the vertical direction corresponds to the radial direction of the tire. The constituent features of a tire 1 according to this embodiment are basically the same as the constituent features of the tire 1 according to the embodiment shown in FIGS. 1-5. The minute regions 20 in this embodiment include adjacent minute regions that are juxtaposed along a circumferential direction of the tire. There are six sizes of interval between adjacent minute regions. Adjacent minute regions are arranged at prescribed intervals along a circumferential direction of the tire such that the six interval sizes vary in a continuous manner along the circumferential direction of the tire. Also, the width of adjacent minute regions along a circumferential direction of the tire is fixed, that is, there is only one size of minute region. Otherwise, the minute regions 20 of this embodiment are the same as the minute regions 20 of the embodiment shown in FIGS. 1-5 and further explanation is omitted.

Similar to the embodiment as shown in FIG. 6, the side surface on which the minute regions 20 are provided in this embodiment appears as though it undulates three-dimensionally in a wave-like manner. Consequently, a person observing the sidewall surface of a tire 1 having this pattern formed on the sidewall surface will not readily notice an actual unevenness existing on the sidewall surface.

There are at least three different sizes of the aforementioned intervals between minute regions, and it is preferable to have four to eight different sizes of interval from the standpoint of obtaining a side surface that appears three-dimensional. With two sizes of interval, it is difficult to obtain a side pattern that makes the side surface appear three-dimensional. Also, having more than eight sizes does not necessarily improve the effect of obscuring the actual unevenness. Although the radial positions of adjacent minute regions vary periodically with respect to a circumferential direction of the tire in this embodiment, it is acceptable if the radial positions do not vary as long as the intervals between adjacent minute regions vary along a circumferential direction of the tire 1. Although it is acceptable if the variation of the intervals between adjacent minute regions is not periodic, it is preferable for the variation to be periodic from the standpoint of making the side surface appear three-dimensional. When the variation of the intervals between adjacent minute regions is periodic, it is acceptable regardless of whether the adjacent minute regions are arranged such that the intervals vary continuously or discretely (in a step-like fashion). However, from the perspective of making the side surface appear three-dimensional, it is preferable to arrange adjacent minute regions such that the intervals between them vary continuously. Additionally, from the standpoint of making the side surface appear to undulate three-dimensionally in a wave-like manner, it is preferable for the a phase of the variation of the intervals between adjacent minute regions to be the same as a phase of the variation of the radial positions of the adjacent minute regions.

Figure 8:
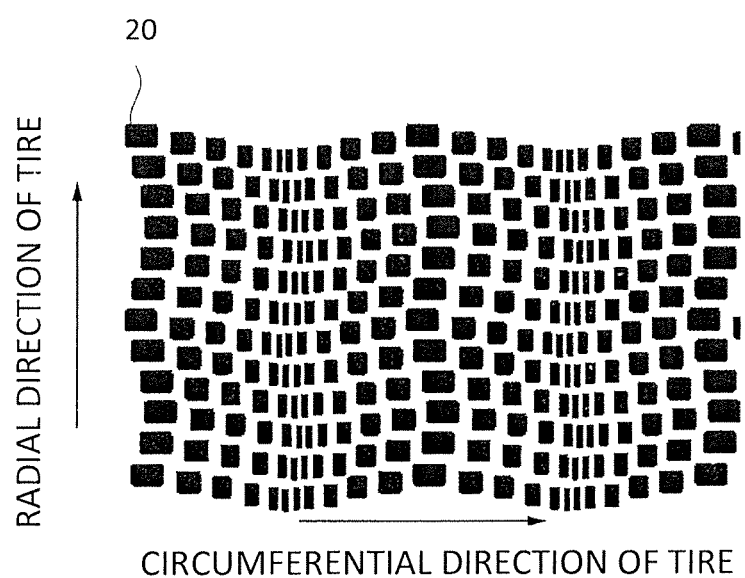
FIG. 8 depicts a side pattern of a sidewall surface as spread out in a linear form according to a further disclosed embodiment.

FIG. 8 depicts a side pattern made up of minute regions 20 used on a sidewall surface of a tire 1 according to another embodiment as the side pattern would appear if the tire were spread out in a linear form. In FIG. 8, the horizontal direction corresponds to the circumferential direction of the tire 1 and the vertical direction corresponds to the radial direction of the tire 1.

The constituent features of a tire 1 according to this embodiment are basically the same as the constituent features of the tire 1 according to the embodiment shown in FIGS. 1-5 as discussed above. The minute regions 20 in this embodiment include adjacent minute regions that are juxtaposed along a circumferential direction of the tire. A width dimension of adjacent minute regions varies among six different sizes, and the intervals between adjacent minute regions vary among six different interval sizes. Adjacent minute regions are arranged to be separated from one another along a circumferential direction of the tire such that the six width sizes and the six interval sizes vary in a continuous manner along the circumferential direction of the tire. Also, the minute regions 20 making up a particular group of adjacent minute regions arranged along a circumferential direction of the tire are arranged such their positions along a radial direction of the tire vary with respect to the circumferential direction of the tire. Similarly, the minute regions 20 making up a particular group of minute regions arranged along a radial direction of the tire are arranged such their positions along a circumferential direction of the tire vary with respect to the radial direction of the tire 1. The sizes of the minute regions in this embodiment vary similar to sizes in the embodiment shown in FIG. 6, and the intervals between adjacent minute regions in this embodiment vary similar to the intervals in embodiment shown in FIG. 7. Thus, further explanation of the sizes and intervals is omitted here.

As shown in FIG. 8, a side surface having minute regions 20 according to this embodiment appears even more as though it undulates three-dimensionally in a wave-like manner than a side surface according to the other embodiments. Consequently, a person observing the sidewall surface of a tire 1 having this pattern formed on the sidewall surface will be even less likely to notice an actual unevenness existing on the sidewall surface.

More particularly, from the standpoint of making the side surface appear even more as though it undulates three-dimensionally in a wave-like manner, it is preferable for the intervals to be smaller in places where the sizes of the adjacent minute regions are smaller, that is, for a phase of the variation of the sizes and a phase of the variation of the intervals to be the same. Additionally, from the standpoint of making the side surface appear even more as though it undulates three-dimensionally in a wave-like manner, it is preferable for a phase of the variation of the radial positions of adjacent minute regions to be the same as the phases of the variation of the intervals and the variation of the sizes.

Figure 9:
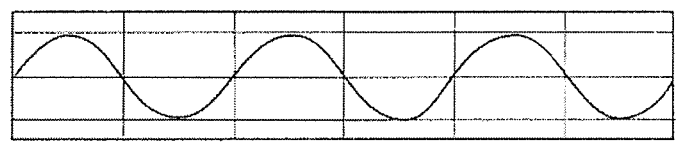
FIGS. 9(a) and (b) illustrate forms of variation of the sizes of minute regions or the intervals between minute regions.
Figure 9:
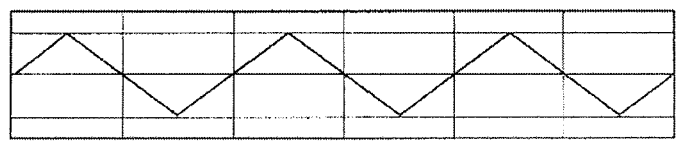

A period of the variation of the sizes of adjacent minute regions, a period of the variation of the intervals between adjacent minute regions, and a period of the variation of the radial positions of adjacent minute regions are preferably within the range of 10 to 60 mm in view of a size of an unevenness that occurs on a side surface due to overlapping of a wrap starting end 5d and a wrap finishing end 5c of a carcass layer 5 at a portion 5e. Additionally, it is preferable if the variation of the sizes of adjacent minute regions, the variation of the intervals between adjacent minute regions, and the variation of the radial positions of adjacent minute regions are in accordance with a periodic function, such as a size wave or a triangular wave as shown in FIGS. 9(a) and (b).

WORKING EXAMPLES

In order to investigate the effects of the embodiments, a number of tires 1 like that shown in FIG. 2 (tire size: 145R126PR) were fabricated with different types of side patterns, formed on a sidewall surface. One hundred people observed each of the fabricated tires and evaluated a visibility of an unevenness (hereinafter called "BPS splice unevenness") actually existing on a sidewall surface at a portion 5e where a carcass layer 5 overlaps itself (external appearance evaluation):

The results of the evaluations are expressed using the following evaluation point system.

110 points: At least 95% of the observers were not able to clearly recognize the unevenness shown in FIG. 3.

108 points: At least 90% of the observers were not able to clearly recognize the unevenness shown in FIG. 3.

106 points: At least 90% of the observers were not able to clearly recognize the unevenness shown in FIG. 3.

104 points: At least 70% of the observers were not able to clearly recognize the unevenness shown in FIG. 3.

102 points: At least 60% of the observers were not able to clearly recognize the unevenness shown in FIG. 3.

100 points: At least 50% of the observers were not able to clearly recognize the unevenness shown in FIG. 3.

97 points: Fewer than 50% of the observers were not able to clearly recognize the unevenness shown in FIG. 3.

The types of sidewall surfaces used in the evaluations and the external appearance evaluation result obtained for each type are shown in Table 1 below. A prior art example is a pneumatic tire exemplifying the prior art and is provided with a multitude of small semispherical or substantially semispherical protrusions of which a cross sectional width and a height are each approximately 0.3 mm to 2 mm. The protrusions include at least two different types of protrusion having different sizes, the surface area of a bottom surface of the smaller protrusions being 2 to 6% the surface area of a bottom surface of the larger protrusions. A Comparative Example 1 has a side pattern comprising a plurality of minute regions 20 provided on a side surface and arranged in a circumferential direction and a radial direction of the tire. A circumferential-direction width dimension of adjacent minute protrusions varies between two different sizes, and there is only one size of interval between adjacent minute regions 20. A Comparative Example 2 has one width size and two different interval sizes. A Working Example 1 has three different width sizes and a Working Example 2 has five different width sizes. A Working Example 3 has three different sizes of interval between adjacent minute regions 20, and a Working Example 4 has five different sizes of interval. Working Examples 5 and 6 use five width sizes and five interval sizes and vary the width size and the interval size; a phase difference between the width variation and the interval variation is different for the two working examples (90 degrees and 0 degrees, respectively). A Working Example 7 has five width sizes different from those of Working Examples 5 and 6 and five interval sizes different from those of Working Examples 5 and 6; the width sizes and the intervals are varied. In each of Working Examples 5 to 7, a period of the width size variation and a period of the interval size variation are the same. In Table 1, width sizes, interval sizes, and periods are representative values corresponding to dimensions at a position along a radial direction of the tire where a tire width is largest. The width sizes and interval sizes are varied in accordance with a sine wave. Since the minute regions 20 are configured have a protruding form as shown in FIG. 4(a), the minute regions 20 are referred to as "protrusions" in Table 1.

TABLE 1

| | Prior art example | Comparative Example 1 | Comparative Example 2 | Working Example 1 | Working Example 2 | Working Example 3 | Working Example 4 | Working Example 5 | Working Example 6 | Working Example 7 |
|---|---|---|---|---|---|---|---|---|---|---|
| Number of different radial length sizes of protrusions | 1 | ← | ← | ← | ← | ← | ← | ← | ← | ← |
| Radial length of protrusions (mm) | 1 | 5 | ← | ← | ← | ← | ← | ← | ← | ← |
| Shape of protrusions | Elliptical | Rectangular | ← | ← | ← | ← | ← | ← | ← | ← |
| Height of protrusions (mm) | 1 | 1 | ← | ← | ← | ← | ← | ← | ← | ← |
| Number of different circumferential width sizes of protrusions | 2 | 2 | 1 | 3 | 5 | 1 | ← | 5 | ← | ← |
| Circumferential width of protrusions (mm) | 3.5 | 5, 10 | 8 | 5, 10, 15 | 3, 4, 5, 6, 7 | 6 | ← | 3, 4, 5, 6, 7 | ← | 2, 3, 4, 5, 6 |
| Number of different interval sizes between protrusions | 2 | 1 | 2 | 1 | 1 | 3 | 5 | ← | ← | ← |

TABLE 1-continued

|  | Prior art example | Comparative Example 1 | Comparative Example 2 | Working Example 1 | Working Example 2 | Working Example 3 | Working Example 4 | Working Example 5 | Working Example 6 | Working Example 7 |
|---|---|---|---|---|---|---|---|---|---|---|
| Interval sizes between protrusions | 2, 4 | 5 | 4, 8 | 6 | 3 | 3, 5, 7 | 1, 2, 3, 4, 5, | ← | ← | 0.5, 1.0, 1.5, 2.0, 2.5 |
| Phase difference between width size and interval size of protrusions in | — | — | — | — | — | — | — | 90 | 0 | ← |
| Period (mm) | — | 35 | 56 | 64 | 64 | 66 | 90 | 70 | 70 | 47 |
| External appearance | 100 | 100 | 100 | 102 | 106 | 102 | 106 | 104 | 108 | 110 |

The prior art example, Comparative Example 1, and Working Examples 1 and 2, demonstrate that using three or more sizes of minute region 20 enables an unevenness actually existing on a sidewall surface to be obscured. Comparative Example 2, and Working Examples 3 and 4 demonstrate that using three or more sizes of interval between minute regions 20 enables an unevenness actually existing on a sidewall surface to be obscured. Working Examples 5 to 7 demonstrate that an unevenness actually existing on a sidewall surface can be obscured to an even greater degree by making the width size variation and the interval size variation in phase with each other (i.e., by using a phase difference of 0 degree).

Although a pneumatic tire according to the present invention has been explained in detail, the present invention is not limited to the previously explained embodiments and various improvements and modifications can clearly be made without departing from the scope of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", inboard", "forward", "rearward", "above", "downward", "vertical", "horizontal", "below" and "transverse" as well as any other similar directional terms refer to those directions of a pneumatic tire according to the present invention. Accordingly, these terms, as utilized to describe the present invention should be interpreted relative to a pneumatic tire according to the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a tread portion extending in a tire circumferential direction; and
a pair of sidewall sections disposed on both sides of the tread portion, respectively, with regard to a tire width direction, at least one of the sidewall sections including a surface pattern region comprising a plurality of minute regions that are arranged along the tire circumferential direction and in a tire radial direction, the minute regions being visually distinguishable from surrounding regions due to a light reflection characteristic or an unevenness of a sidewall surface, the minute regions being configured such that width dimensions along the tire circumferential direction of adjacent ones of the minute regions that are juxtaposed with respect to one another along the tire circumferential direction varying among at least three different width sizes, and the minute regions being arranged in order of size such that the width dimensions of adjacent minute regions vary continuously or in steps along the tire circumferential direction, the adjacent minute regions of the surface pattern region being juxtaposed next to each other at at least three differently sized intervals, and the adjacent minute regions being separated from one another along the tire circumferential direction such that the at least three differently sized intervals vary continuously or in steps along the tire circumferential direction;
the adjacent minute regions are arranged in order of size along the tire circumferential direction such that sizes of the adjacent minute regions vary periodically at a prescribed period and sizes of the intervals between adjacent minute regions vary at the prescribed period, and a phase at which the sizes of adjacent minute regions vary and a phase at which the intervals vary are equal; and positions of the adjacent minute regions along the tire radial direction vary periodically in accordance with a period at which the sizes of adjacent minute regions vary and at which the three or more intervals between adjacent minute regions vary.

2. The pneumatic tire according to claim 1, wherein the sizes of the adjacent minute regions and the three or more intervals vary in accordance with a sine wave, a triangular wave or a periodic function.

3. The pneumatic tire according to claim 2, wherein the prescribed period is within a range of 10 mm to 60 mm; the at least one of the sidewall sections includes partitioning walls that are configured to partition the minute regions from the surrounding regions; and at least one of the minute regions has a surface roughness characteristic that creates a light reflecting characteristic that is different from a light reflecting characteristic of at least one of the surrounding regions.

4. The pneumatic tire according to claim 2, wherein the prescribed period is within a range of 10 mm to 60 mm; at least one of the minute regions is a protruding region that protrudes from one of the surrounding regions or a recessed region that is recessed in one of the surrounding regions; and at least one of the minute regions has a surface roughness characteristic that creates a light reflecting characteristic that is different from a light reflecting characteristic of at least one of the surrounding regions.

5. The pneumatic tire according to claim 1, wherein the prescribed period is within a range of 10 mm to 60 mm.

6. The pneumatic tire according to claim 1, wherein the at least one of the sidewall sections includes partitioning walls that are configured to partition the minute regions from the surrounding regions.

7. The pneumatic tire according to claim 1, wherein at least one of the minute regions is a protruding region that protrudes from one of the surrounding regions or a recessed region that is recessed in one of the surrounding regions.

8. The pneumatic tire according to claim 1, wherein at least one of the minute regions has a surface roughness characteristic that creates a light reflecting characteristic that is different from a light reflecting characteristic of at least one of the surrounding regions.

9. The pneumatic tire according to claim 1, wherein the plurality of minute regions are arranged in rows that extend along the tire radial direction and are spaced from each other in the tire circumferential direction.

10. A pneumatic tire comprising:
a tread portion extending in a tire circumferential direction; and
a pair of sidewall sections disposed on both sides of the tread portion, respectively, with regard to a tire width direction, at least one of the sidewall sections including a surface pattern region comprising a plurality of minute regions that are arranged along the tire circumferential direction and a tire radial direction, the minute regions having a light reflective characteristic or an unevenness of a surface which demarcates the minute regions from surrounding regions, the minute regions being arranged with at least three different sizes of intervals between adjacent minute regions juxtaposed along the tire circumferential direction, and the adjacent minute regions being arranged such that the sizes of the intervals vary continuously or in steps along the tire circumferential direction with the sizes of the intervals varying periodically at a prescribed period along the tire circumferential direction and positions of the adjacent minute regions along the tire radial direction varying periodically in accordance with the sizes of the intervals.

11. The pneumatic tire according to claim 10, wherein the sizes the intervals vary according to a sine wave, a triangular wave or a periodic function.

12. The pneumatic tire according to claim 11, wherein the prescribed period is within a range of 10 mm to 60 mm; the at least one of the sidewall sections includes partitioning walls that are configured to partition the minute regions from the surrounding regions; and at least one of the minute regions has a surface roughness characteristic that creates a light reflecting characteristic that is different from a light reflecting characteristic of at least one of the surrounding regions.

13. The pneumatic tire according to claim 11, wherein the prescribed period is within a range of 10 mm to 60 mm; at least one of the minute regions is a protruding region that protrudes from one of the surrounding regions or a recessed region that is recessed in one of the surrounding regions; and at least one of the minute regions has a surface roughness characteristic that creates a light reflecting characteristic that is different from a light reflecting characteristic of at least one of the surrounding regions.

14. The pneumatic tire according to claim 10, wherein the prescribed period is within a range of 10 mm to 60 mm.

15. The pneumatic tire according to claim 10, wherein the at least one of the sidewall sections includes partitioning walls that are configured to partition the minute regions from the surrounding regions.

16. The pneumatic tire according to claim 10, wherein at least one of the minute regions is a protruding region that protrudes from one of the surrounding regions or a recessed region that is recessed in one of the surrounding regions.

17. The pneumatic tire according to claim 10, wherein at least one of the minute regions has a surface roughness characteristic that creates a light reflecting characteristic that is different from a light reflecting characteristic of at least one of the surrounding regions.

18. The pneumatic tire according to claim 10, wherein the plurality of minute regions are arranged in rows that extend along the tire radial direction and are spaced from each other in the tire circumferential direction.

* * * * *